Patented Aug. 17, 1948

2,447,387

UNITED STATES PATENT OFFICE 2,447,387

PROCESS OF RENDERING FLAVOR ACCESSIBLE IN NUT BUTTERS AND STABILIZATION THEREOF

Fitzhugh L. Avera, Laguna Beach, and Joseph L. Rosefield, Oakland, Calif.; said Avera assignor to said Rosefield No Drawing. Application May 3, 1943, Serial No. 485,496

9 Claims. (Cl. 99—128)

1

The invention, in general, relates to the production of nut butters and more particularly relates to a method of rendering flavors available in nut butters, nut products, spreads and the like, as well as the provision of desired flavors in such butters, products and spreads and the stabilization of such substances.

As is probably well known to those skilled in the art of producing nut butters of various kinds, the nut flavors reside in the solid constituents of the food after manufacturing and are not present or soluble in the remaining liquid phase of the nut butters after manufacture. In other words, the comminution of the solid constituents to render the same capable of assuming a desired consistency, which is a customary step in the manufacture of all nut butters in general, separates the solid and remaining liquid phases in such a manner as to disperse the solid flavor carriers of the raw material to such an extent in the flavor insoluble liquid that the end product is appreciably deficient in flavor and, accordingly, is lacking in desired palatable characteristics. The present invention is directed to obviating the loss of these liquid flavor carriers during the manufacturing processes without sacrificing the stability of the products.

One of the principal objects of our present invention is to restore the original flavor solvent of nut butters, which is present in the raw material before processing, either in part or substantially in its entirety, to provide a product with an added flavor solvent in any desired proportion.

Another object of our invention is to provide improved nut butters containing desired proportions of either added or restored, or both added and restored, flavor solvents in emulsified form and wherein the flavor solvent is present either as the internal, dispersed phase or as the external, continuous phase.

A still further object of the present invention is to provide improved nut butters containing desired proportions of either added or restored flavor solvents constituting flocculation agents capable of altering the solid-liquid phase either from a liquid dispersed in solid or a solid dispersed in liquid to a plastic mass resisting gravital separation of liquids or deposition of solids.

Another object of our present invention is to provide nut butters wherein a liquid flavor solvent is substituted in whole or in part for the major liquid phase normally present in such butters thus affording tastier products without destroying the nutritive values thereof.

2

A still further object of our invention is to provide an improved method of manufacturing nut butters wherein the action of sonic, super-sonic or ultra-sonic vibrations is applied to further the stabilization of the products by acting upon the dispersion of the solids or upon the liquid interfaces or upon both the solids and liquid interfaces.

A still further object of our present invention is to provide an improved process of manufacturing nut butters wherein a dineric interface modifier is utilized as an agent assisting stabilization.

Other objects of the invention, together with some of the advantageous features thereof, will appear from the following description of a preferred mode, as well as certain modified modes of practicing our improved process to afford our improved nut butters. It is to be understood, of course, that we are not to be limited to the precise modes of manufacture hereinafter described, nor to the precise order of steps of the processes set forth, as our invention, as defined in the appended claims, can be embodied in a plurality and variety of forms and practiced in a plurality and variety of ways.

Before alluding specifically to the preferred and modified modes of preparing our improved products, it is desired to point out that while the processes described are equally suitable to the production of any desired nut butter, nut products or spreads, such as the production of butters from the edible portions or legumes of certain plants including soya beans and similar plants, our improved processes have been especially adapted to the manufacture of regular peanut butter and, accordingly, the processes shall be described in that environment.

In its preferred mode, our improved process of rendering flavors accessible in nut butters, nut products, spreads and the like, as well as stabilizing the same, as especially exemplified in peanut butters, preferably comprises following the initial customary steps of roasting shelled peanuts, cooling and blanching the same, grinding or comminuting the roasted, cooled and blanched peanuts to provide a homogeneous mass, together with the step of introducing into the mass a flavor carrier of the type resident in the raw material prior to roasting or of any other desired type either in combination with suitable stabilizing agents as a solvent or by mechanical means.

We have discovered that in the step of roasting the peanuts an appreciable amount of the flavor solvent or carrier of the nut is lost with the result that regular peanut butter heretofore manufactured does not contain its full bodied flavor. Accordingly, and in accordance with our invention, we restore either in part or in substantially its entirety, or in a desirable proportion, a flavor carrier that can be identical with the flavor carrier driven off during the roasting step, or a flavor carrier of a different type so as to provide a peanut butter with a substantially natural full bodied flavor. These flavor carriers or solvents may be restored or added to the mass of comminuted peanuts at any stage of manufacture subsequent to the roasting step or even after the completion of the manufacturing steps normally followed in producing regular peanut butter or other nut butter. For example, the flavor carrier or solvent may be introduced into the mass of comminuted nuts immediately after the mass has been subjected to mechanical treatment for expressing either all or a portion of the oil therefrom, or can be introduced into the mass during the step of mixing into the mass an edible oil, hydrogenated or not, or a fat or a wax. Moreover, the flavor carrier can be introduced mechanically if desired by subjecting the mass to the action of sonic, super-sonic or ultra-sonic vibrations.

Our improved method of manufacturing stabilized emulsions of nut butters to which a flavor solvent has either been added or the original flavor carrier restored in part or substantially entirely is adaptable to the processing of peanuts of all types including oil deficient peanuts, such as the Virginia peanuts. Moreover, the improved method is adaptable to nut butters of the type in which all of the oil has been expressed to afford a non-fattening nut butter or in which a small portion of the oil has been expressed during its manufacture. In processing oil deficient peanuts in accordance with our process, we preferably not only supply a desirable amount of oil to a comminuted mass of the peanuts to bring the finished product to the desired nutritive value, but also mix into the mass at the time of introducing the added oil a desired amount of water for carrying the flavor in its full bodied extent into the finished product. Where a peanut butter of the non-fattening type is desired to be produced, wherein substantially all of the oil has been removed, water alone is added to the comminuted mass of peanuts thus restoring to the butter the flavor solvent lost in the roasting step and bringing the finished product to the desired full bodied flavor. Suitable preservative factors, such as lecithin, may be added, if desired, during the course of manufacture of these peanut butters or other nut butters. However, in the event that all of the oil has not been removed from the butter, a flavor carrier, such as water, is preferably combined with a negative catalyst or anti-oxidant or a dineric interface modifier, which may be selected from a higher fatty acid group, such as a monoglyceride ester of a fatty acid, to prevent any undue catalytic action between the oil and the water. It may be interpolated here that if it is desired to make use of a dineric interface modifier naturally present in the raw material the oil should be extracted from the raw material in order to make such dineric interface modifier available for combining with the flavor solvent, such as water, when introduced into the mass. Since it is desirable, for the most efficacious product, to incorporate an edible oil, either hydrogenated or not, a fat, or a wax, into the comminuted mass of nuts after the expressing action, we preferably mix the flavor solvent, such as water, with such agents as are specified above and introduce such mix preferably during the step of mixing the oil, fat or wax into the mass; the anti-oxidant or negative catalyst or dineric interface modifier preventing, as stated above, any undue catalytic action between the oil and the water.

The flavor solvent or carrier which is introduced into the nut butter, as hereinabove explained, may be introduced either alone, or in the form of an emulsion, or as a flocculation agent whose polar nature alters the solid-liquid phases of the butter from a liquid dispersed in solid or from a solid dispersed in a liquid to a stable plastic mass in that no gravital separation will occur, or to a fluid having a low viscosity which resists gravital deposition of the solids or separation of the liquids. In combining the flavor solvent or carrier with the nut butter in the form of an emulsion, any suitable commercially available emulsification agent, such as cholesterol, which is free from enzymic action, can be utilized. The flavor solvent in the finished product, using this type of emulsification agent, would exist as the internal dispersed phase. In order to provide a nut butter product in which the flavor solvent resides in the form of an emulsion as the external, continuous phase, a commercially available emulsification agent free of enzymic action, such as lecithin, may be combined with the flavor solvent either at the time of introduction thereof into the mass or separately. In order to assist the stabilization of the flavor solvent in the finished product, we preferably make use of a dineric interface modifier which may be selected from a higher fatty acid group, as indicated above. The dineric interface modifier may, of course, be one that is naturally present in the raw material and isolated for such use, or may be added separately. We have found that such interface modifiers assist the stability of the flavor solvent in the finished product whether it be of a single or mixed emulson type, or combination of emulsion and dispersion type, or flocculated or colloidal suspensions, of any and all of the solid or liquid phases present. In attaining the stabilization of the flavor solvent or carrier in nut products including those in the nature of peanut butters, we have found that in producing an emulsion of the oil-in-water type or of the water-in-oil type, or of a mixed phase type, a preferable emulsifying agent comprises a combination of interface modifiers. A desirable combination of such modifiers is one which contains an interface modifier that is predominantly lipophilic, such as melissyl betain chloride, together with an interface modifier which is predominantly hydrophilic in nature, such as sodium propyl sulphate. The two modifiers act jointly to balance the lipophylic and hydrophilic character of the entire solution to be emulsified by virtue of their preferential wetting of the phase interfaces.

A modified process of preparing nut butters wherein the flavors have been rendered accessible and stabilized comprises mechanically dispersing, emulsifying, flocculating or colloidally suspending the flavor solvent or carrier in the finished product. The preferable mode of mechanically accomplishing the foregoing comprises subjecting the mixture constituents of a homogeneous mass of comminuted nuts containing the restored or added flavor solvent, either with or without the addition of an edible oil, fat or wax, to the action of sonic, or super-sonic, or ultra-sonic vibrations. Moreover, we preferably select a sonic frequency or frequency band area which is resonant to the molecular aggregates present and the wave traverse of which is in the same order of size as the molecular aggregate to be affected. It is to be understood that the energy applied to the product, either during the manufacture thereof or subsequently, by such sonic, super-sonic, or ultrasonic vibrations need not be restricted to any stated frequency or frequency band area or areas.

The products produced in accordance with the foregoing preferred process and modifications thereof are of full bodied flavor, substantially free from rancidity for appreciable periods of time, and stabilized not only as to the maintenance therein of the flavor solvent but also stabilized with respect to the matter of separation of the various constituents of the product. Moreover, the finished products are non-sticky and any added flavoring, such as salt, sugar, chocolate and the like, is also stabilized in the respect that they do not drop out but are held in our products so manufactured by the foregoing processes.

It is to be understood that the appended claims are to be accorded a range of equivalents commensurate in scope with the advance made over the prior art.

We claim:

1. A method of preparing nut butters of full bodied flavor, said method comprising introducing a flavor solvent into a comminuted mass of nuts in the presence of a dineric interface modifier.

2. A method of preparing nut butters of full bodied flavor, said method comprising the step of introducing a flavor solvent into a comminuted mass of nuts in the presence of a combination of flavor solvent stabilizers composed of a dineric interface modifier of lipophilic character and a dineric interface modifier of hydrophilic character.

3. A method of rendering flavors accessible in nut butters and of stabilizing the same, said method comprising introducing a flavor solvent into a mass of comminuted nuts in the presence of a stabilizing agent selected from the higher fatty acid group.

4. A method of rendering flavors accessible in nut butters and of stabilizing the same, said method comprising introducing a flavor solvent in the presence of a monoglyceride ester of a fatty acid into the butters during the manufacture thereof.

5. A method of rendering flavors accessible in nut butters and of stabilizing the same with enhanced nutritive value, said method comprising the steps of roasting a quantity of shelled nuts, cooling and blanching the nuts, comminuting the nuts to a homogeneous mass, expressing substantially all of the oil from the comminuted nuts, and then mixing with the mass of comminuted nuts a flavor solvent constituting an oil-in-water emulsion wherein the oil is substantially the same quantity as that expressed from the mass of nuts.

6. A method of rendering flavors accessible in nut butters and of stabilizing the same, said method comprising introducing a flavor solvent in the form of an emulsion into a mass of comminuted nuts; said emulsion containing melissyl betain chloride and sodium propyl sulphate.

7. A method of preparing nut butters of full bodied flavor, said method comprising introducing a flavor solvent into a comminuted mass of nuts in the form of an oil-in-water emulsion and in the presence of cholesterol.

8. A method of rendering flavors accessible in nut butters and of stabilizing the same, said method comprising the steps of roasting a quantity of shelled nuts, cooling and blanching the same, comminuting the nuts to a homogeneous mass, expressing a portion of the liquid phase from the comminuted nuts, and then mixing into the mass of nuts a flavor carrier in the presence of cholesterol.

9. A method of rendering flavors accessible in nut butters, said method comprising the steps of preparing a mixture composed of a flavor solvent combined with a stabilizer and a mass of comminuted nuts, and subjecting the mixture to the action of sonic vibrations.

FITZHUGH L. AVERA.
JOSEPH L. ROSEFIELD.

REFERENCES CITED

The following references are of record in the file of this patent:

UNITED STATES PATENTS

| Number | Name | Date |
| --- | --- | --- |
| 604,493 | Kellogg | May 24, 1898 |
| 1,398,352 | Willison | Nov. 29, 1921 |
| 1,445,174 | Rosenfield | Feb. 13, 1923 |
| 1,926,369 | Brown | Sept. 12, 1933 |
| 2,198,219 | Musher | Apr. 23, 1940 |
| 2,198,220 | Musher | Apr. 23, 1940 |
| 2,217,701 | Musher | Oct. 15, 1940 |